W. SYLVESTER.
CHAIN COUPLING AND CHAIN ADJUSTING APPLIANCE.
APPLICATION FILED MAR. 4, 1918.

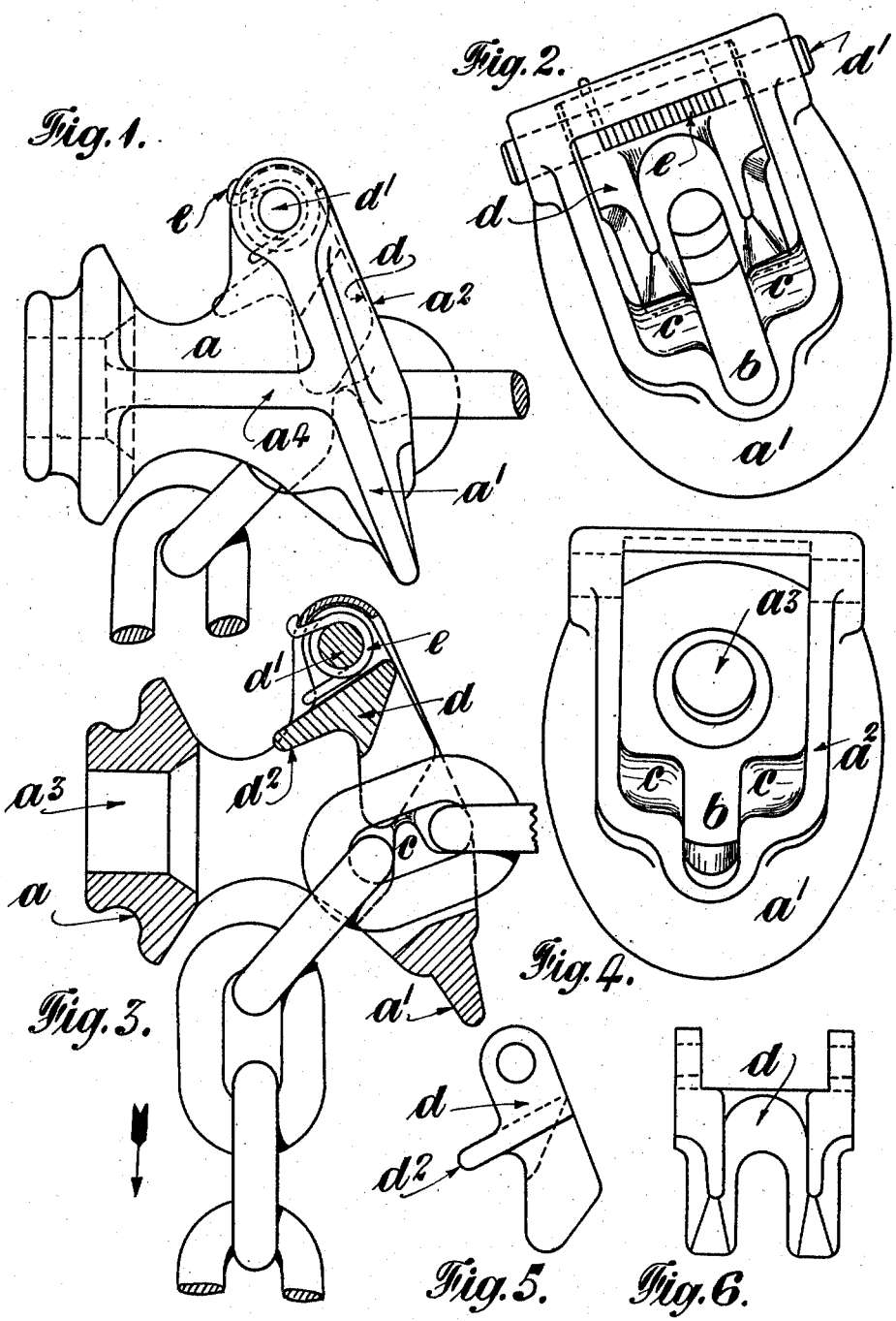

1,303,521.

Patented May 13, 1919.
2 SHEETS—SHEET 2.

Inventor:-
Walter Sylvester

By his Attorney:- Walter Gunn

UNITED STATES PATENT OFFICE.

WALTER SYLVESTER, OF TUNSTALL, ENGLAND.

CHAIN-COUPLING AND CHAIN-ADJUSTING APPLIANCE.

1,303,521.      Specification of Letters Patent.     Patented May 13, 1919.

Application filed March 4, 1918. Serial No. 220,296.

*To all whom it may concern:*

Be it known that I, WALTER SYLVESTER, a subject of the King of Great Britain and Ireland, and resident of Tunstall, Staffordshire, England, have invented a new or Improved Chain-Coupling and Chain-Adjusting Appliance, of which the following is a specification.

This invention has for its object to provide a simple and self-contained appliance for enabling a chain or chains to be readily adjusted in length relatively to a hook or the like, or one chain or set of chains relatively to another.

According to the invention, the appliance which is made of metal, comprises a lantern-like or substantially tubular body part, one end of which is enlarged and the opening through which is elongated and substantially rectangular. Such enlarged end is also beveled relatively to the longitudinal axis of the appliance. In the lower parts of such opening are teeth and a central groove with which the links of a chain may engage. In the upper part of the opening is a spring-pressed pawl, the central part of the free end of which is grooved, so as to allow the pawl to fit the links of the chain engaging the teeth and groove in the lower part of the said opening. At its other end the said body part is formed to allow of its connection with a hook or the like. The intermediate part of the appliance is open top and bottom.

In a modified construction both ends of the appliance have the elongated opening and pawl, the appliance then being useful for connecting one chain to another. In a further modified construction, the appliance is formed with two elongated openings and provided with two pawls at one or both ends.

Upon the accompanying drawings,

Figure 1 illustrates a side elevation,

Fig. 2 a front elevation, and

Fig. 3 a longitudinal section of one example of the improved chain coupling and adjusting appliance.

Figs. 4, 5 and 6 illustrate parts of the appliance separately.

As shown, the appliance comprises a lantern-like or substantially tubular body part $a$ which at one end is enlarged and surrounded by a flange $a'$, the said enlarged end being formed so that the flange shall lie at an angle of about 75° to the longitudinal axis of the body part. The opening in said enlarged end is substantially rectangular in shape, see Figs. 2 and 4, and lies partly above and partly below the said axis of the body part. In the metal forming the lower part of the opening is a central groove $b$ which lies parallel with the longitudinal axis of the body part, while to right and left of said groove and with their axes at right angles to the groove are teeth $c$, $c$, see Figs. 3 and 4. The end face $a^2$ of the enlarged end is sloped to a slightly greater angle than the flange $a'$ from the upper end to a point opposite to the teeth $c$, $c$, partly to give width and strength of metal where the teeth are formed, and partly to reduce the size and weight of the upper part of the enlarged end.

On a chain being passed through the said rectangular opening in the enlarged end of the body part, one of the links lies in the central groove $b$ and the ends or shoulders of the next adjoining links lie to right and left of the teeth, see Fig. 3. In this way the chain is positioned relatively to the appliance, and by drawing the chain through the opening, or drawing the appliance along the chain, backward or forward, the position may be varied. In the upper part of said rectangular opening is pivotally mounted a pawl $d$ adapted normally to lie within the rectangular opening and bear against the teeth $c$, $c$ in the lower part of the opening. Said pawl, see Figs. 5 and 6, is grooved centrally at its free end so as to be able to engage the teeth $c$, $c$ even with a chain link lying in the groove in the lower part of the opening, see Fig. 3.

Around the axis $d^1$ of the pawl is coiled a wire spring $e$, one end of which engages the pawl and the other the body part $a$, which at such point is curved or arched and serves to partly inclose the spring and pawl axis. By means of the spring the pawl is held firmly against the teeth $c$, $c$. The end of the pawl is sloped off to allow the chain to be readily drawn through the appliance in the direction of the arrow, see Fig. 3.

Upon the back of the pawl is a small finger lug $d^2$ by which, when requiring to draw the chain through the appliance in a direction opposite to that of the arrow, the pawl may be readily raised clear of the teeth and chain links.

By means of the pawl, when pressing against the teeth $c, c$ the chain is firmly held against withdrawal.

Figure 7:
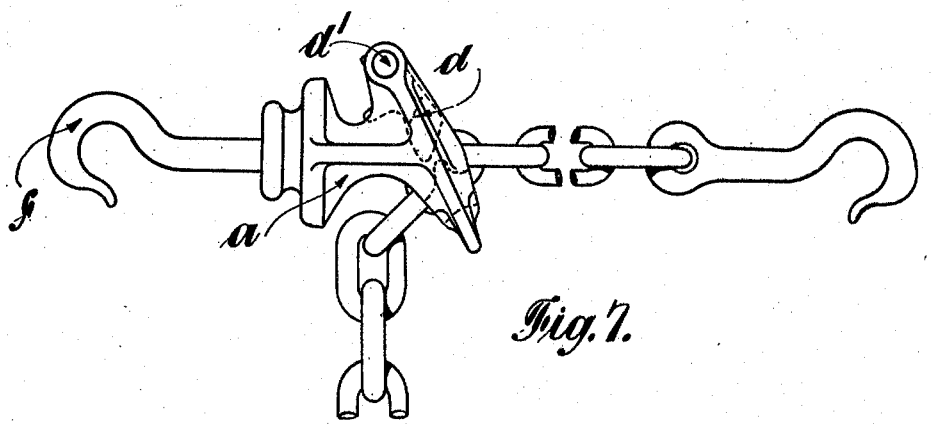
Fig. 7 illustrates one of the uses of the improved appliance.
Figure 11:
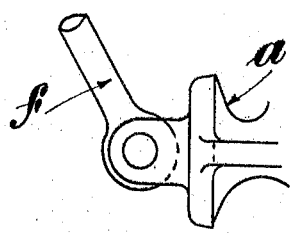

At its other end, the said body part of the appliance is formed with a circular boring $a^3$ through which one end of the stem of a swivel hook $f$, see Fig. 7, may loosely pass, the head of the stem lying within the appliance. Or the hook may be hingedly or flexibly connected with the appliance, see Fig. 11.

The middle part of the appliance is open top and bottom, the opening in the top giving access to the finger lug $d^2$ of the pawl $d$, and the opening in the bottom allowing for the passage of the chain. The slope of the enlarged end of the block causes the bottom opening to be longer than the top opening, which allows of the chain being more readily drawn through the appliance. Those parts of the appliance next to the teeth $c, c$ are steeply inclined and extend to the edge of the bottom opening, see Fig. 3. To strengthen the appliance it may be formed with web-like parts $a^4$ on each side, which extend into the flange $a'$, see Fig. 1.

Figure 8:
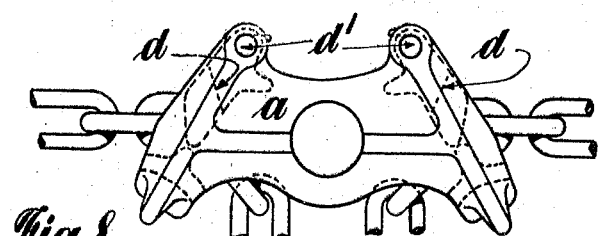
Figs. 8, 9, 10 and 11 illustrate modifications.

In Fig. 7 the appliance is shown as adapted for taking up the slack of a chain between two connecting hooks. In Fig. 8 the appliance is shown with both ends enlarged, and both provided with a pawl, and therefore adapted for taking up the slack between two chains, or for adjustably connecting one chain to another.

Figure 9:
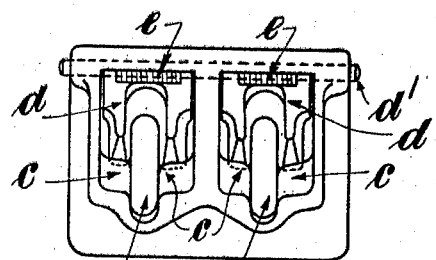
Figure 10:
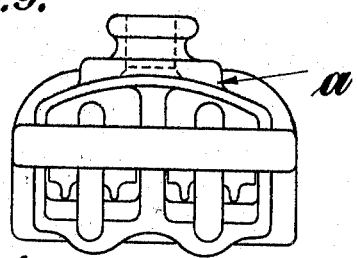

In Figs. 9 and 10 the appliance is shown in elevation and plan with two rectangular openings in one end, and with two pawls, one for each opening, the arrangement being suitable for use with two chains.

What I claim is:—

1. A chain adjusting appliance comprising a substantially tubular body part, having openings in its opposite sides and also having at one end an elongated and rectangular opening through which and one of the openings in the side of the body part a chain may pass and said end opening at one part being provided with a groove parallel to the longitudinal axis of the appliance and also with teeth lying to right and left of and at right angles to said groove, a pawl pivotally mounted in another part of said opening, and having a central groove in its free end adapted to come opposite the groove in the opening, a spring for holding the pawl normally within the said opening, and with its free end bearing against the said teeth, and means at the other end of the said body part of the appliance for connecting the appliance to any other object, substantially as herein set forth.

2. A chain adjusting appliance comprising a substantially tubular body part, having openings in its opposite sides and also having at one end an elongated and rectangular opening through which and one of the openings in the side of the body part a chain may pass and said opening at one part being provided with a groove parallel to the longitudinal axis of the appliance and also with teeth lying to right and left of and at right angles to said groove, a pawl pivotally mounted in another part of said opening, and having a central groove in its free end adapted to come opposite the groove in the opening, a spring for holding the pawl normally within the said opening, and with its free end bearing against the said teeth, a boss at the other end of the appliance with central boring, and a hook with stem part rotatably fitting the bore of said boss, substantially as herein set forth.

3. A chain adjusting appliance comprising a substantially tubular body part having openings in its opposite sides and also having at each end an elongated and rectangular opening, through which and one of the openings in the side of the body part a chain may pass, and each opening at one part being provided with a groove parallel to the longitudinal axis of the appliance, and also with teeth lying to right and left and at right angles to said groove, a pawl pivotally mounted in another part of each opening and having a central groove in its free end adapted to come opposite the groove in the opening, and a spring for holding each pawl normally within its opening and with its free end bearing against the said teeth of the opening, substantially as herein set forth.

In witness whereof I have hereunto set my hand in the presence of two witnesses.

WALTER SYLVESTER.

Witnesses:
HARRY MOLYNEUX,
C. H. SYLVESTER.